(12) United States Patent
Hudson et al.

(10) Patent No.: US 8,478,548 B2
(45) Date of Patent: Jul. 2, 2013

(54) USER INTERFACE SYSTEM AND METHOD FOR DIAGNOSING A ROTATING MACHINE CONDITION NOT BASED UPON PRIOR MEASUREMENT HISTORY

(75) Inventors: Eric Hudson, Arlington, WA (US); Demet Namli, Seattle, WA (US); Rand Peterson, Mukilteo, WA (US); Joseph Ferrante, Redmond, WA (US)

(73) Assignee: Fluke Corporation, Everett, WA (US)

( * ) Notice: Subject to any disclaimer, the term of this patent is extended or adjusted under 35 U.S.C. 154(b) by 637 days.

(21) Appl. No.: 12/688,736

(22) Filed: Jan. 15, 2010

(65) Prior Publication Data

US 2011/0178737 A1 Jul. 21, 2011

(51) Int. Cl.
*G01M 13/02* (2006.01)
(52) U.S. Cl.
USPC .................... 702/36; 702/56; 702/184
(58) Field of Classification Search
USPC ............ 702/34–36, 39, 56, 182–185; 73/587, 73/593
See application file for complete search history.

(56) References Cited

U.S. PATENT DOCUMENTS

| 4,237,454 | A  | * | 12/1980 | Meyer ............................ 340/682 |
| 6,192,325 | B1 |   | 2/2001  | Piety et al. |
| 2003/0065482 | A1 | * | 4/2003 | Bechhoefer .................... 702/183 |
| 2009/0292505 | A1 | * | 11/2009 | Van Dyke et al. ............. 702/184 |
| 2011/0257900 | A1 | * | 10/2011 | Adams et al. ................... 702/33 |

* cited by examiner

*Primary Examiner* — Manuel L Barbee
(74) *Attorney, Agent, or Firm* — Perkins Coie LLP

(57) ABSTRACT

A vibration data collection and rotating machinery fault diagnostic instrument includes a machine setup engine, a measurement engine, a diagnostic engine, a measurement user interface module, a machine setup user interface module, and a diagnostic user interface module. The machine setup engine requests and receives parameters about the machinery through the machine setup user interface module. The measurement engine requests and receives sensor placement locations through the measurement user interface module and keeps track of locations that have been measured and locations that still need to be measured. The diagnostic engine diagnoses machinery faults and presents the information to the user through the diagnostic user interface module using an intuitive graphical severity scale.

20 Claims, 18 Drawing Sheets

Setup: Transmission with Closed Couple

Motor close coupled: ○ Yes  ⦿ No

Setup: Transmission without Closed Coupling

Coupling between motor and next component: ⦿ Yes  ○ No

Next component: [Compressor]

*FIG. 3B*

Setup: Driven Component

Driven component bearing type: ⦿ Roller bearing  ○ Journal bearing

Compressor type: [Screw compressor]

No. of screw teeth or threads [Optional]: [3]

Drive Train

Setup: Transmission without Closed Coupling

Coupling between motor and next component: ● Yes  ○ No

Next component: Gearbox ▼

Gearbox bearing type: ● Roller bearing  ○ Journal bearing

Number of speed changers: 1 ▼  — 430

What is known: Shaft speeds ▼  — 432

RPM entry method: ● Manual  ○ Tach  — 434

Input: 200

Output: 200

Is there a flexible coupling between gearbox and next component: ● Yes  ○ No

Next component that gearbox is attached to: Fan ▼

USER INTERFACE SYSTEM AND METHOD FOR DIAGNOSING A ROTATING MACHINE CONDITION NOT BASED UPON PRIOR MEASUREMENT HISTORY

TECHNICAL FIELD

The present disclosure relates generally to vibration measurement of rotating machinery and diagnosing machinery faults.

BACKGROUND

Vibrations can occur in all types of rotating equipment, such as electric motors, fans, turbines, other machinery, or combinations thereof. The vibrations may be characteristic of regular operation of the equipment. However, machine conditions, such as unbalance, misalignment, bearing wear, looseness, and eccentric shafts, can cause vibrations that lead to equipment failure. Vibrations can be measured by using a sensor such as an accelerometer to measure vibration waveforms. In conjunction with the accelerometers, vibration analyzers can be used to obtain frequency and amplitude information about the vibrations that are present. This information can be used to diagnose machinery faults prior to failure.

Conventionally, extensive training and experience in vibration data collection and analysis is required to determine equipment conditions and to diagnose machine faults and an impending equipment failure. Predictive maintenance databases established from prior measurement history of a particular system have also conventionally been used to determine rotating machine conditions and diagnose faults.

BRIEF DESCRIPTION OF THE DRAWINGS

Examples of a vibration tester and machinery fault diagnostic instrument and method are illustrated in the figures. The examples and figures are illustrative rather than limiting.

FIGS. 3A-3C show queries and sample responses for prompting and receiving system setup parameters, according to an embodiment of the disclosure.

FIGS. 4A-4D show queries and sample responses for prompting and receiving gearbox parameters, according to an embodiment of the disclosure.

DETAILED DESCRIPTION

Figure 1:
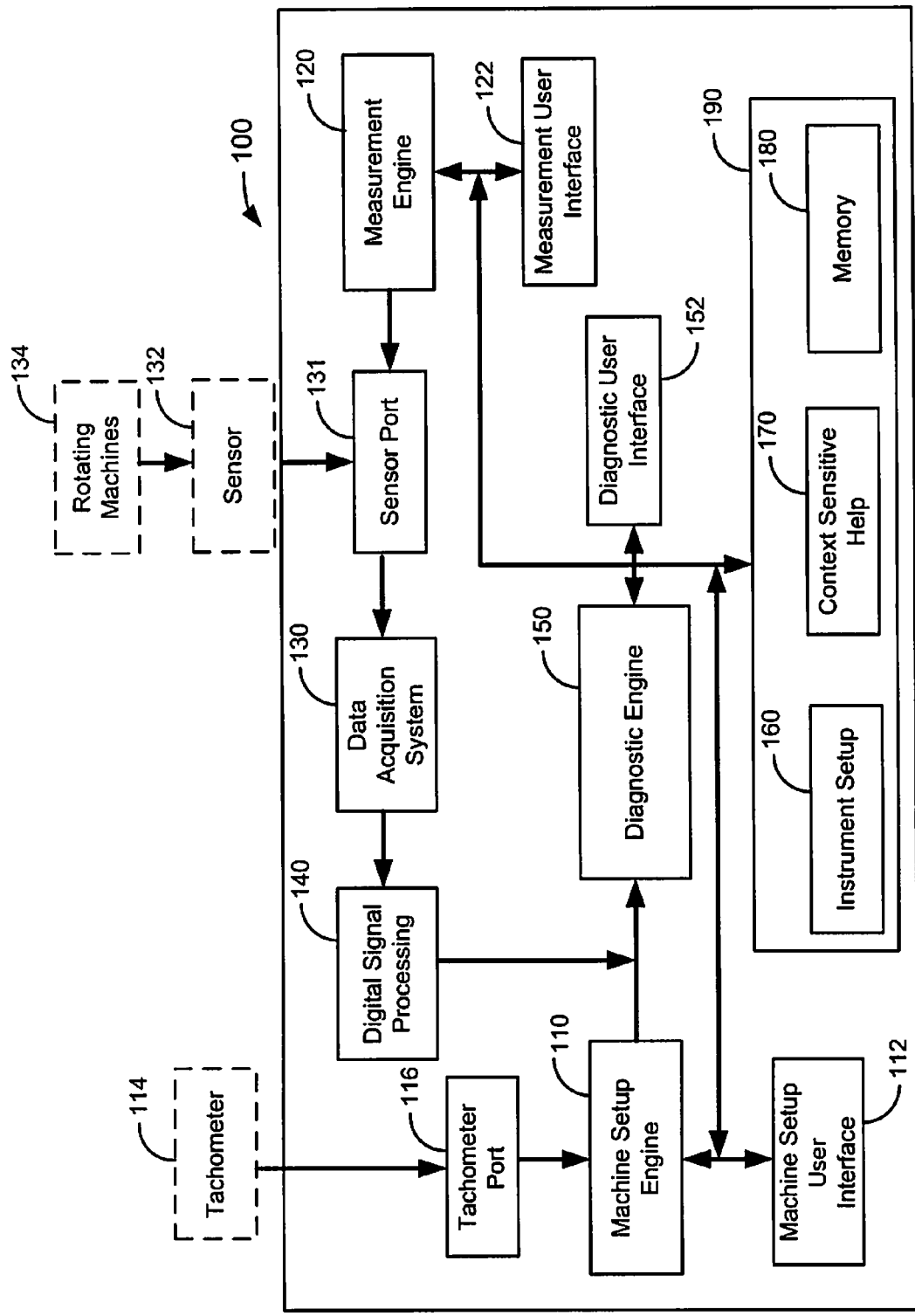
FIG. 1 is a block diagram illustrating an example of a vibration data collection and mechanical diagnostic instrument, according to an embodiment of the disclosure.

The following description and drawings are illustrative and are not to be construed as limiting. Numerous specific details are described to provide a thorough understanding of the disclosure. However, in certain instances, well-known or conventional details are not described in order to avoid obscuring the description.

Without intent to further limit the scope of the disclosure, examples of instruments, apparatus, methods and their related results according to the embodiments of the present disclosure are given below. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

An instrument that collects vibration data from rotating equipment and analyzes the vibration signals for machinery faults is described below. The instrument may be configured or otherwise utilized by a novice user inexperienced with vibration data collection and analysis. The instrument facilitates a simplified method that can use a non-historic-based threshold, diagnostic engine, tri-axial sensor orientation and context sensitive help to deliver diagnostic results with recommended repair actions and vibration spectra. The instrument can allow a user to quickly and easily determine the condition of rotating equipment. It is not required for the user to have had prior training or experience in vibration analysis, nor is it required that a predictive maintenance database has been established for the rotating equipment in order to use the instrument for diagnosing machinery faults.

FIG. 1 is a block diagram illustrating an example of a vibration tester and machinery diagnostic instrument 100 according to an embodiment of the disclosure. The instrument 100 can include a machine setup engine 110, a setup user interface 112, a measurement engine 120, a measurement user interface 122, a data acquisition system 130, a digital signal processor 140, a diagnostic engine 150, and a diagnostic user interface 152. The instrument 100 can also include an instrument setup engine 160, a context sensitive help database 170, and one or more memory units 180.

Using the instrument 100 to diagnose machine fault conditions may include: (1) setup of the machinery system under test; (2) measurement of the system under test; and (3) diagnosis of the system under test. The instrument 100 walks the user through the method in an easy-to-understand manner.

Figure 3A:
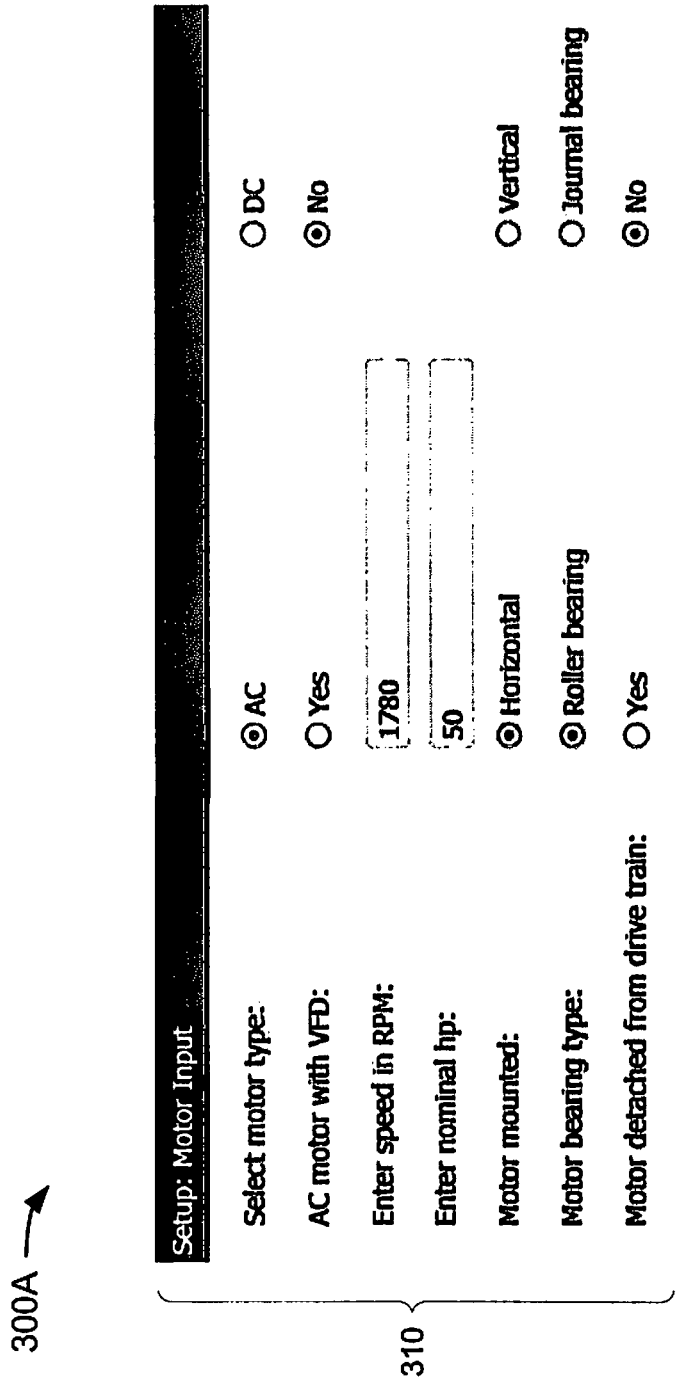

The machine setup engine 110 can be coupled to the machine setup user interface 112. The machine setup engine 110 can generate a set of questions that the user answers in order to provide sufficient information as to the components of the equipment to be diagnosed and the parameters of those components. Examples of parameters that can be requested by the instrument 100 include, but are not limited to, the motor type, speed, horsepower, bearing type, and method of coupling to driven components. The type and other parameters specific to driven components may also be requested. The generated questions can be shown to the user through the machine setup user interface 112, and the machine setup user interface 112 either provides answer choices or a space for the user to respond to the questions. Non-limiting examples of the types of questions generated and typical user responses are shown in FIGS. 3A-3C. Because the instrument 100 is intended to be used by users who may not be expected to have had much experience working with vibration testers and analyzers, the questions are straightforward questions that a technician would typically either be able to answer based upon rudimentary knowledge of the system to be diagnosed, or the information can be found on the label or nameplate of the machinery to be tested. The more information that the user can provide to the machine setup engine 110, the higher the resulting level of diagnostic confidence. A typical interaction with the machine setup engine 110 is described below.

The machine setup engine 110 can accept manual input of the running speed of the relevant part of the rotating machinery. Alternatively, the instrument 100 has a tachometer input port 116 that can accept data from a tachometer 114. The tachometer 114 can be setup by the user to monitor the rotational speed of a drive shaft in the rotating machinery. A tachometer is particularly useful for determining the running speed of a variable frequency drive under varying load conditions. There are many ways in which tachometer pulses can be generated. For example, reflective tape can be placed on the rotating drive shaft of the equipment to be monitored. An optical transducer transmits light from a light source and can detect the reflection of the transmitted light from the reflective tape. Each revolution of the rotating drive shaft generates one tachometer pulse. In one embodiment, the tachometer 114 includes a laser tachometer. Another example of a transducer that can be used as a tachometer for monitoring the running speed is an encoding disk attached to the drive shaft. The encoding disc interrupts an optical beam between photoelectric transducers to generate tachometer pulses.

The measurement engine 120 can be coupled to the measurement user interface 122. The measurement engine 120 can generate a set of questions based upon the answers received by the machine setup engine 110. A graphical depiction of the system to be diagnosed can be provided by the measurement engine 120 and shown to the user through the measurement user interface 122. For example, based on the power of the driving motor and the types of driven components in the system to be diagnosed, the measurement engine 120 identifies the bearing locations or locations of other types of rotating components mechanically coupled to the machine housing in the system where vibration data may be collected. The user can select any number, up to and including all, of these locations through the measurement user interface 122 as a sensor location for taking a vibration measurement. By taking at least one vibration measurement per component, sufficient vibration information should be available for a diagnosis by the instrument 100. Additionally, once the user has placed a sensor at each of the selected locations, the user can enter information as to the order of the locations at which vibration data is taken, the location of the sensor relative to the component to be measured, the orientation of the sensor relative to the shaft of the component to be measured, etc. Non-limiting example of the types of questions generated and typical user responses are shown in FIGS. 4A-4D. As the user sets up the sensor for each of the user-selected vibration measurement locations in the system, the measurement engine 120 can prompt the user for the relevant information. A typical interaction with the machine setup engine 110 is described below.

The instrument 100 can include a sensor input port 131 that accepts data from a sensor 132, such as a single axis or tri-axial accelerometer. The sensor 132 measures the vibrations from a rotating machine system 134. Vibration data recorded by the sensor 132 can be sent to the data acquisition system 130 through the sensor port 131 on the instrument 100. The recorded vibration data is taken in the time domain. The data acquisition system 130 then sends the time domain data to the digital signal processor 140, and the digital signal processor 140 transforms the time domain data to frequency domain spectral data. The results of the frequency domain spectral data are then processed using various filters.

The diagnostic engine 150 can be coupled to the diagnostic user interface 152. In one embodiment, the diagnostic engine 150 compares the frequency domain data to a rule set stored in memory to arrive at a diagnosis of machine faults and recommendations for maintenance. A graphical depiction of the estimated severity of machine faults at each of the measured locations is provided by the diagnostic engine 150 and shown to the user through the diagnostic user interface 152. A brief textual description can be provided with the graphical severity scale depiction. A typical interaction with the diagnostic engine 150 is described below.

The instrument 100 can also include a system resources block 190 that can include an instrument setup engine 160, a context sensitive help database 170, and one or more memory units 180. The instrument setup engine 160 may permit the user to run a self-test on the instrument, access instrument settings, such as date and time, or clear memory functions. The context sensitive help database 170 may provide answers to users' frequently asked questions about setup of the system under test, vibration measurements with the sensor, diagnostic results, a glossary, or tips for troubleshooting problems with the instrument. The memory units 180 can include but are not limited to, RAM, ROM, and any combination of volatile and non-volatile memory. The instrument setup engine 160, the context sensitive help database 170, and one or more memory units 180 can communicate with the user through the machine setup user interface 112, the measurement user interface 122, and the diagnostic user interface 152.

Figure 2:
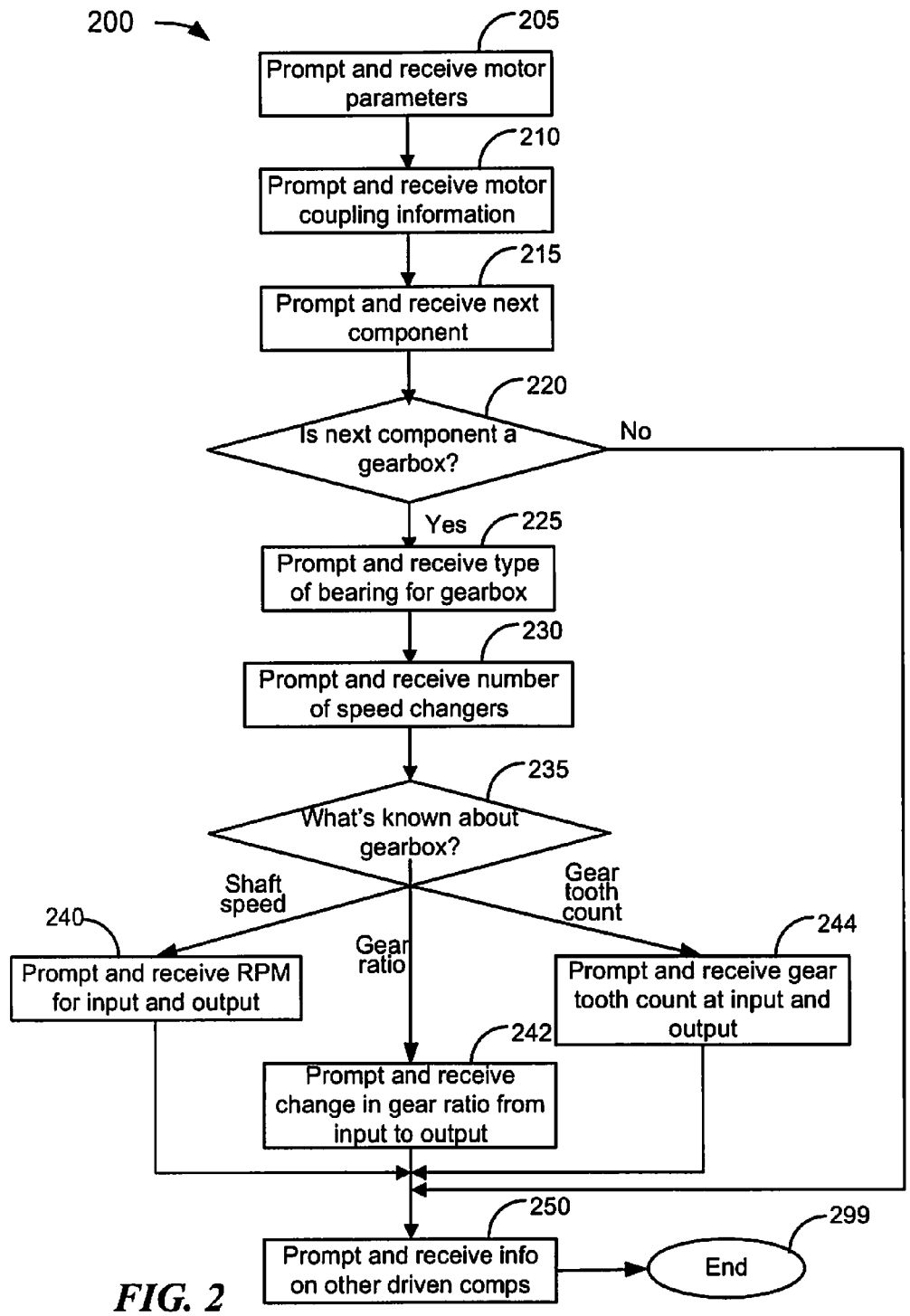
FIG. 2 is a flow diagram illustrating an exemplary process for prompting and receiving system setup parameters by a vibration tester and machinery fault diagnostic instrument, according to an embodiment of the disclosure.

FIG. 2 is a flow diagram illustrating an exemplary process for prompting and receiving system setup parameters by the instrument 100, according to an embodiment of the disclosure. Queries for the setup parameters made by the setup engine 110 can be shown to the user through the machine setup user interface 112. At block 205, the instrument 100 prompts the user for and receives from the user parameters that describe the motor driving the system that is being diagnosed. Examples of queries and responses obtained from a user in a typical interaction are shown in FIG. 3A. Parameters 310 that are requested by the instrument 100 include, but are not limited to, type of motor (AC or DC), whether the motor has a variable frequency drive (VFD), the speed of the motor in revolutions-per-minute (RPM), the nominal power of the motor in horsepower, the direction the motor is mounted (horizontal or vertical), the type of motor bearing (roller or journal), or whether the motor is detached from the drive train.

Then at block 210, the instrument 100 prompts the user for and receives from the user coupling information for the motor. Examples of queries and sample responses obtained from a user in a typical interaction are shown in FIG. 3B. For example, at section 320, the instrument 100 queries whether the motor includes a close coupled transmission and at section 322 whether there is a coupling between the motor and the next component in the system. Then at block 215 (FIG. 2), the instrument 100 queries the user about the next component (if any).

At decision block 220, the instrument 100 determines whether the component being driven by the motor is a gearbox 421. If the component is not a gearbox (block 220—NO), the process continues to block 250 where the instrument 100 prompts the user for and receives from the user information on other driven components. The prompted questions may be specific to the type of component that is being driven by the motor. Examples of queries and sample responses 330 obtained from a user for a screw compressor are shown in FIG. 3C. The process ends at block 299.

Figure 4A:
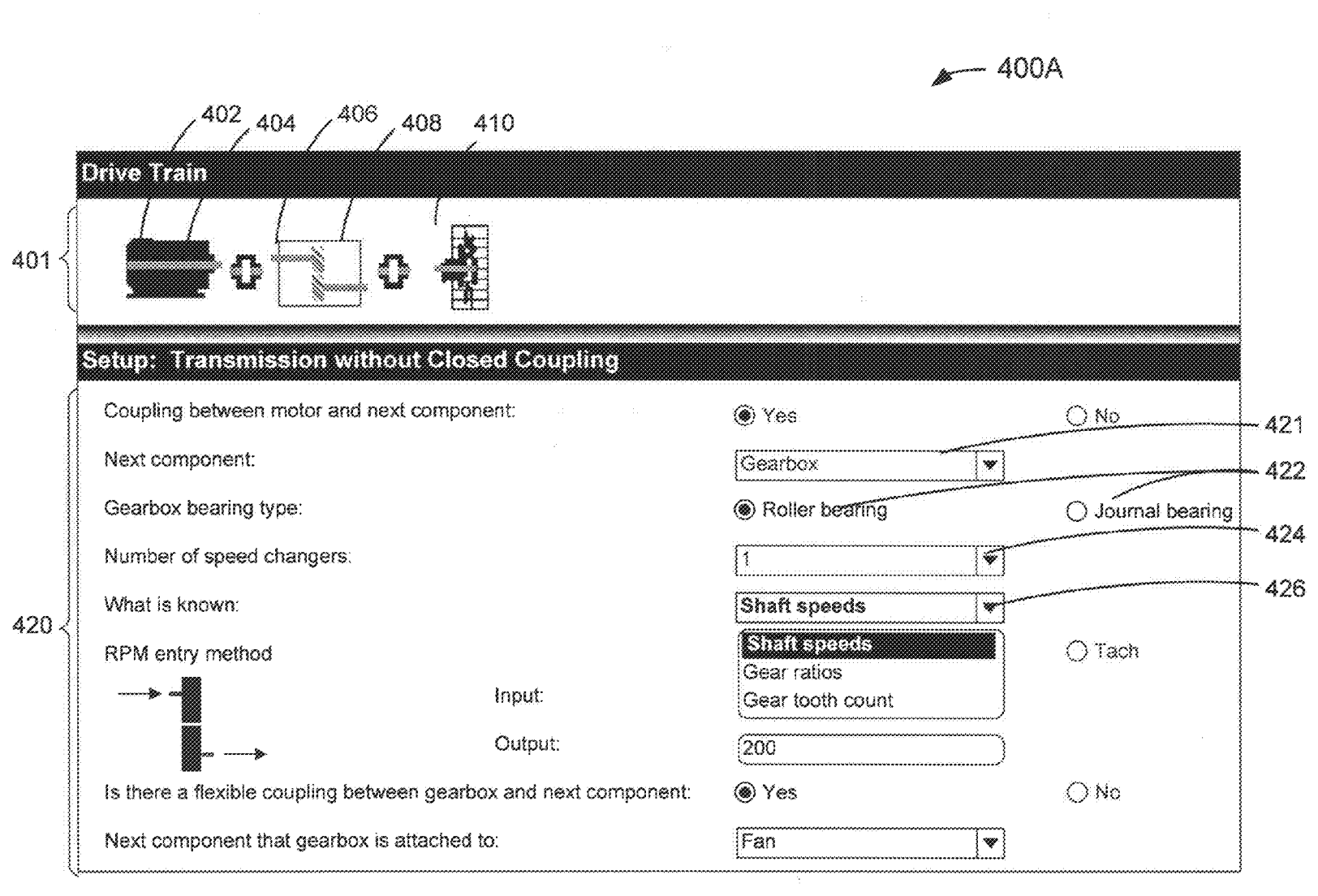

FIG. 4A shows an example drive train 401 comprising a motor 402 coupled to a gearbox 406 that drives a fan 410. The couplings 404 and 408 in the drive train 401 indicate that the motor 402 is coupled to the gearbox 406 and that the gearbox is coupled to the fan 410, respectively. Examples of queries and sample responses pertaining to the gearbox 406 are shown in section 420 of FIG. 4A.

If the next component is a gearbox 421 (block 220—YES), then at block 225 the instrument 100 prompts the user for and receives from the user the type of bearing 422 used in the gearbox 421. Then at block 230, the instrument 100 prompts the user for and receives from the user the number of speed changers 424 used in the gearbox 421. And at decision block 235, the instrument 100 determines what the user knows about the gearbox by providing a drop-down menu 426 with choices such as shown in FIG. 4A. At least one of the following items of information may also be provided by the user about the gearbox: the shaft speeds 427, the gear ratio 428, or the gear tooth count 429.

FIG. 4B shows example queries and sample responses pertaining to the shaft speeds of the gearbox 421. If the user selects shaft speed 430 as the known parameter, at block 240 the instrument 100 prompts the user for and receives from the user the shaft speeds at the input 432 of the gearbox and at the output 434 of the gearbox. The process continues to block 250 as described above.

Figure 4C:
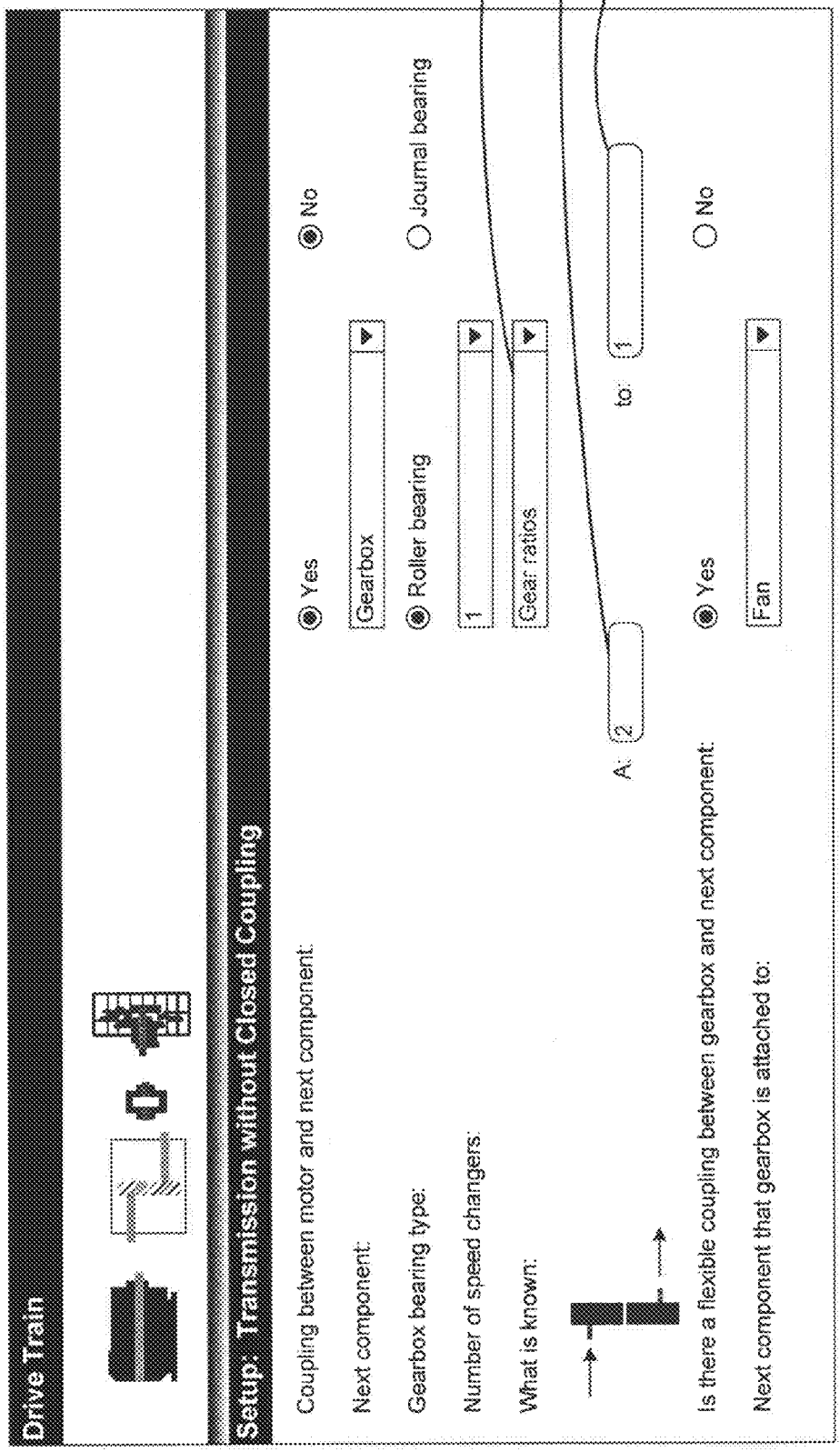

FIG. 4C shows example queries and sample responses pertaining to the gear ratio of the gearbox 421. If the user selects gear ratio 440 as the known parameter, at block 242 the instrument 100 prompts the user for and receives from the user the gear ratio from the input 442 of the gearbox to the output 444 of the gearbox. The process continues to block 250 as described above.

Figure 4D:
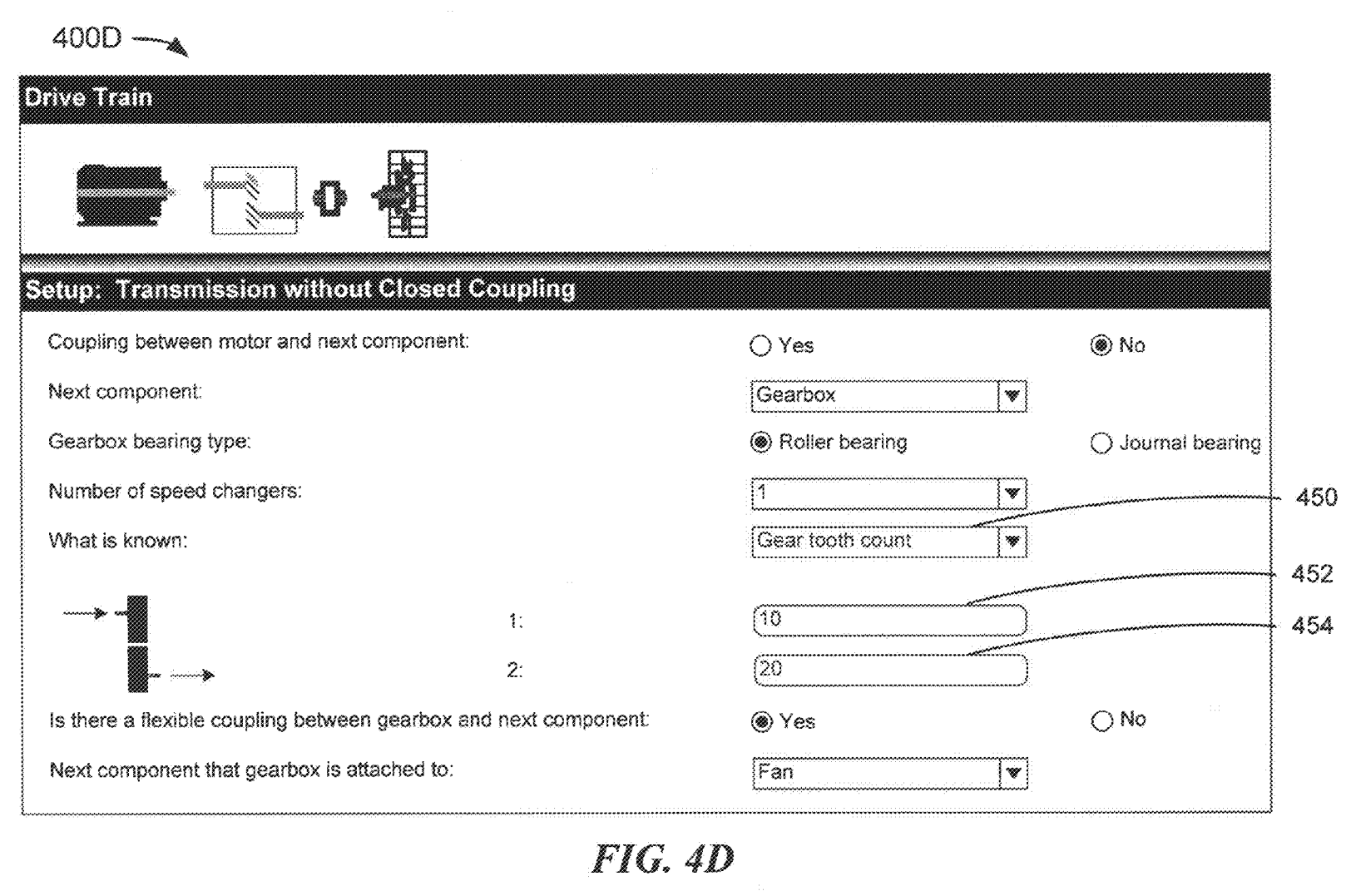

FIG. 4D shows examples of queries and sample responses pertaining to the gear tooth count of the gearbox 421. If the user selects the gear tooth count 450 as the known parameter, the instrument 100 prompts the user for and receives from the user the gear tooth count on the input gear 452 of the gearbox and on the output gear 454 of the gearbox. The process continues to block 250 as described above.

Figure 5:
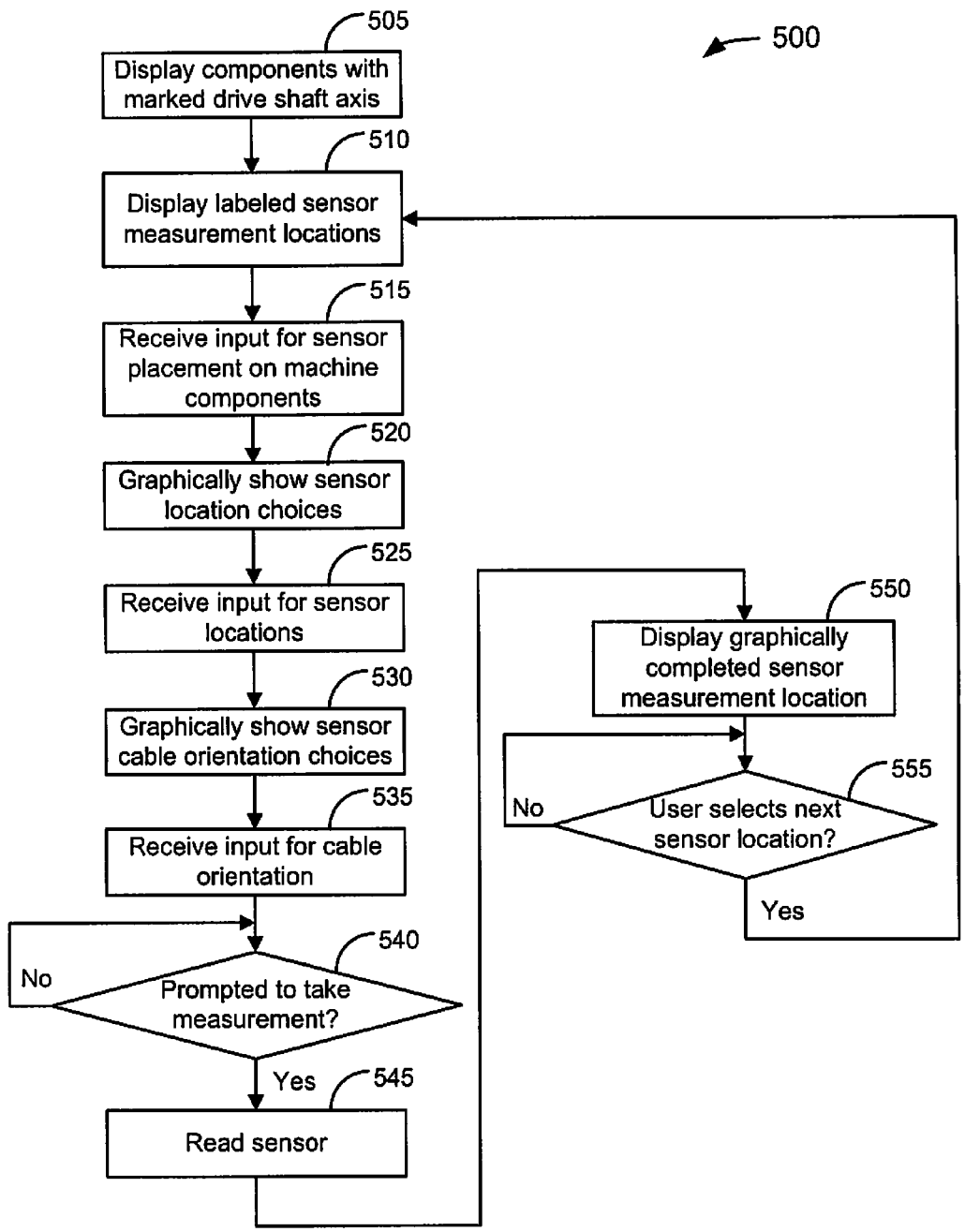
FIG. 5 is a flow diagram illustrating an exemplary process for prompting and receiving sensor measurements by a vibration tester and machinery fault diagnostic instrument, according to an embodiment of the disclosure.

FIG. 5 is a flow diagram illustrating an exemplary process 500 for prompting and receiving sensor measurement by the vibration tester and machinery fault diagnostic instrument 100 according to an embodiment of the disclosure. At block 505, the instrument 100 graphically displays the components in the system to be diagnosed as entered by the user in the interactions with the machine setup engine 110 in process 200. Each of the components can be marked with the drive shaft axis as a frame of reference. In one embodiment, the drive shaft axis can be marked in a different color from the system components, for example, the drive shaft can be shown in red, and the drive train components can be shown in black. A non-limiting example of a graphical component display for a system comprising a motor 602 coupled to a compressor 606 is shown in an example screen shot shown in FIG. 6A.

At block 510, the instrument 100 displays the locations of the bearings or other types or rotating components that are mechanically coupled to the machine housing. The user can select any of these locations in the system for taking a vibration measurement with a sensor. Measuring the vibration data with the instrument 100 at the specified locations 610, 611, 612 and 613 may occur in any particular order, although typically measurements are taken sequentially starting from the free end of the drive motor and ending at the driven end of the driven component. Rather, the instrument 100 may provide the user flexibility in determining the order of measurements by keeping track of the locations where vibration measurements have already been taken and the locations remaining to be measured, as described below. The information as to which locations have already been measured and which locations remain to be measured can be provided graphically in an easily understood format for the user.

Figure 6A:
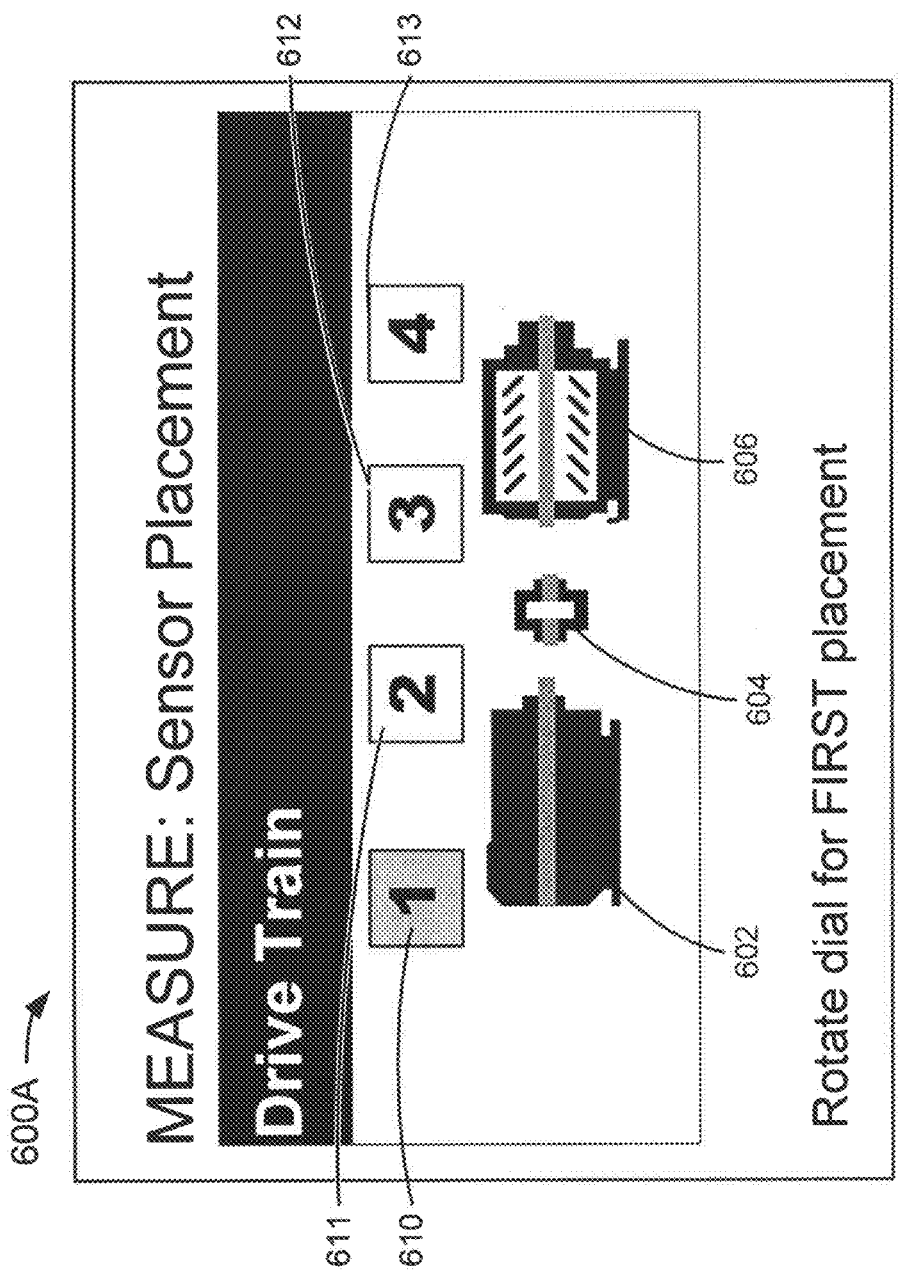
FIGS. 6A-6G show example screen shots for prompting and receiving sensor measurement locations and sensor orientation information, according to an embodiment of the disclosure.
Figure 6B:
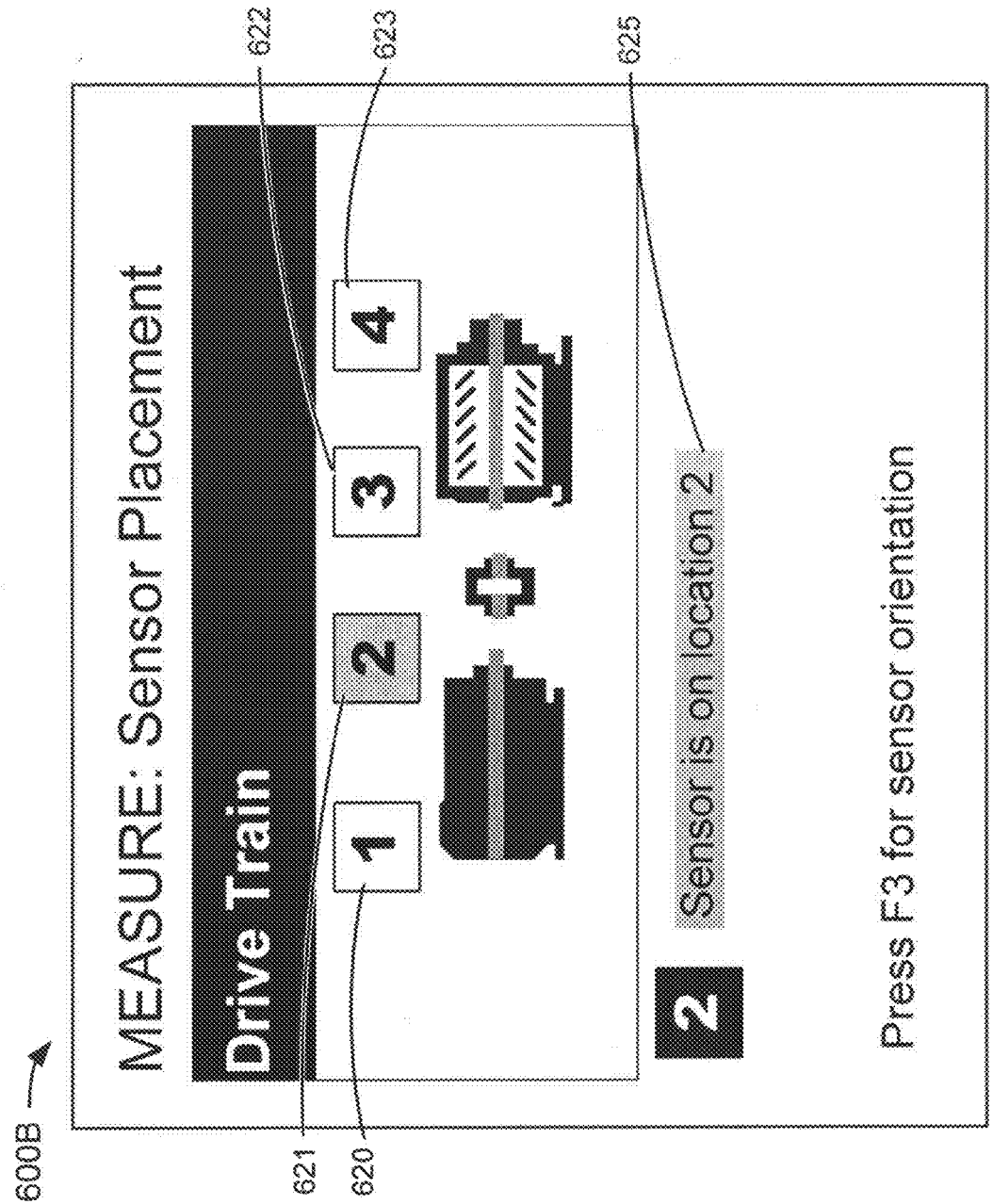

At block 515, the instrument 100 receives input for sensor placement locations on the machine components. The user can select the measurement location by rotating an input dial on the instrument 100 until the appropriate sensor location is highlighted. In one embodiment, the selected sensor location is highlighted in a different color, for example orange. In the example of FIG. 6A, a first sensor location 610 at the free end of the drive motor 602 is highlighted by the instrument 100 by default. The user is prompted, for example, to rotate the input dial of the instrument to select a sensor location for measurement. In the example of FIG. 6B, a second sensor location 621 has been selected by the user, as indicated by the highlighting of sensor location 2 and the text 625 below the graphic. The remaining unselected and as yet unmeasured sensor locations 620, 622 and 623 are not highlighted. In addition, below the graphic of the drive train and sensor locations, the instrument 100 may provide textual information 625 regarding selections made by the user for the sensor measurement. The user may also be prompted to input, e.g., by pressing a function key F3 on the instrument 100, the sensor orientation information.

Figure 6C:
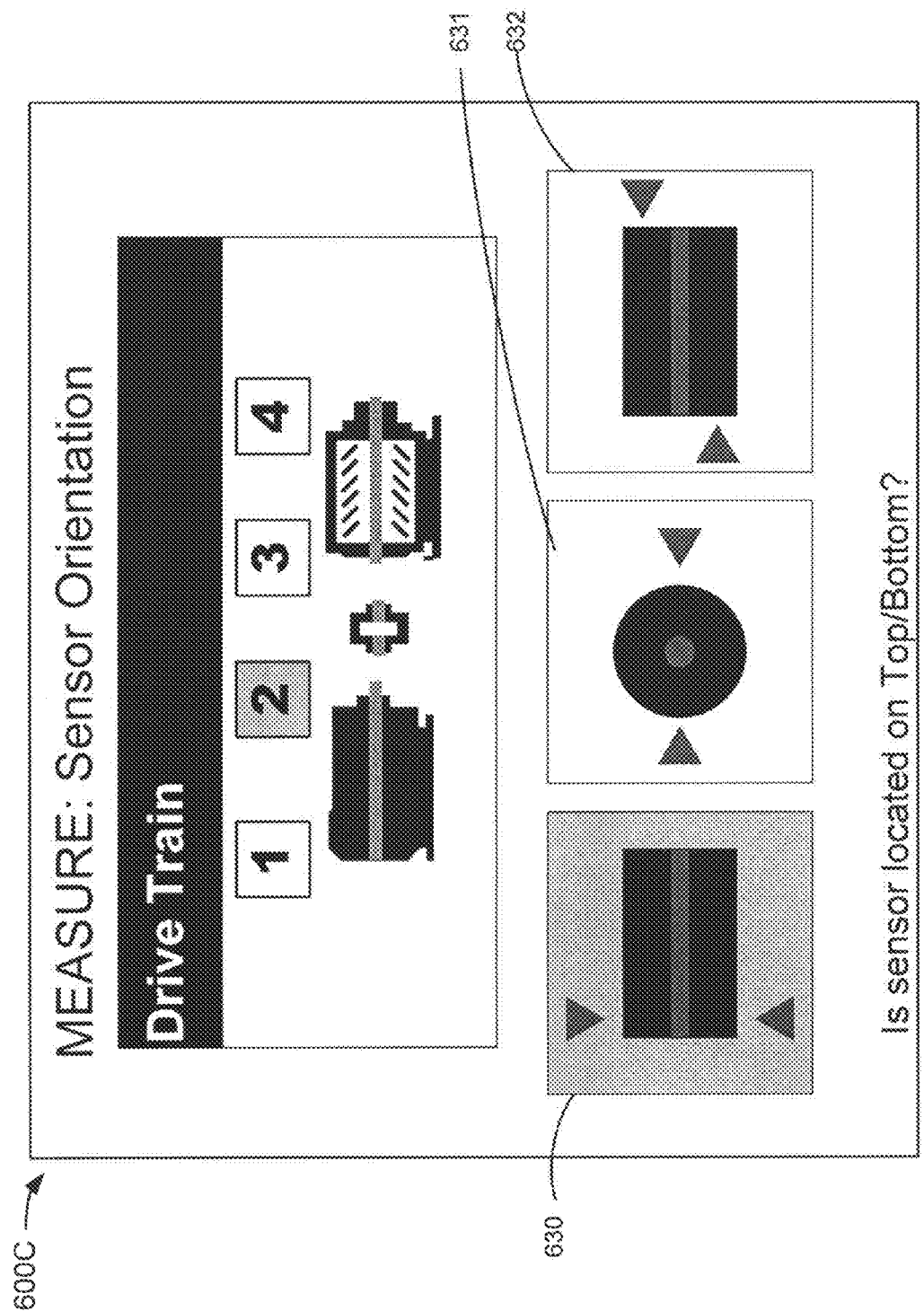

At block 520, the instrument 100 graphically shows three possible orientations for the sensor relative to the machine components. Examples of three sensor orientations are shown in FIG. 6C: (1) the sensor 630 is located on the top or bottom of the component; (2) the sensor 631 is located on the side of the component; or (3) the sensor 632 located at the end of the component. Then at block 525, the instrument 100 receives the user's input as to the sensor orientation for that particular sensor.

Figure 6D:
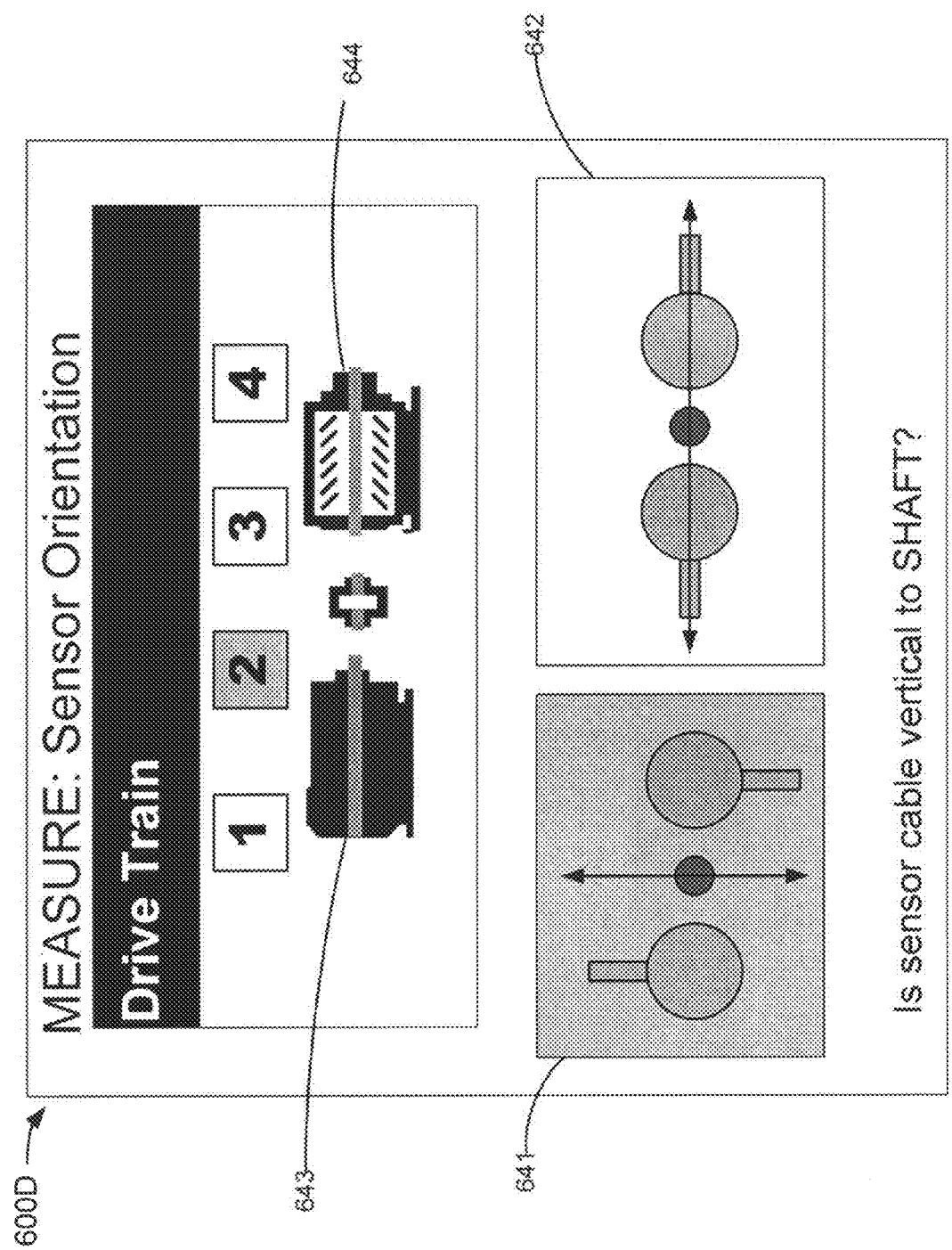

At block 530, the instrument 100 graphically shows two possible scenarios for sensor cable orientation. Examples of two sensor cable orientations are shown in FIG. 6D: (1) the sensor cable 641 is spaced from to the drive axis; or (2) the sensor cable 642 intersects the drive axis. Then at block 535, the instrument 100 receives the user's input as to the sensor cable orientation for that particular sensor. U.S. patent application Ser. No. 12/324,682, filed Nov. 26, 2008, describes a system and method of correlating the orientation of a tri-axial accelerometer, and is incorporated by reference herein in its entirety.

Figure 6E:
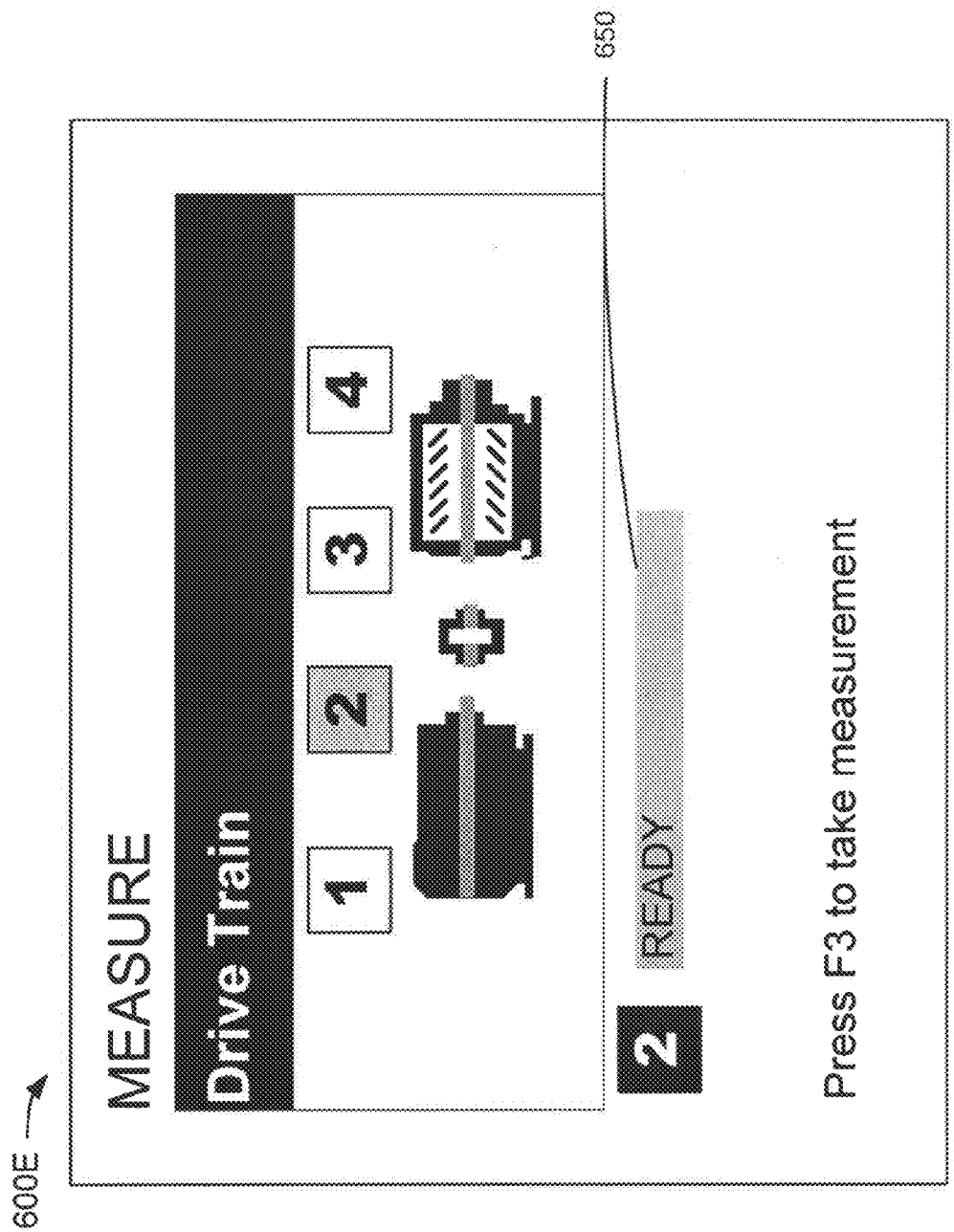

At decision block 540, the instrument 100 determines if the user has prompted the instrument 100 to take a measurement. The user prompts the instrument 100 to take a measurement after the user has appropriately set up the sensor and provided the sensor placement, sensor orientation, and/or sensor cable orientation to the instrument 100 as discussed above. FIG. 6E shows an example of a screen shot where the text 650 indicates that the instrument 100 has received the sensor location, sensor orientation, and sensor cable orientation for location 2 and that the instrument 100 is ready to record the data for that sensor. The user can be prompted to, for example, press the function key F3 on the instrument 100 to take a sensor vibration measurement with the instrument. If the user has not commanded the instrument 100 to record sensor information at the sensor input to the instrument 100 (block 540—NO), the process remains at decision block 540. If the user commands the instrument 100 to take a measurement, at block 545 the instrument 100 reads the sensor information at the sensor input port 131 to the instrument.

Figure 6F:
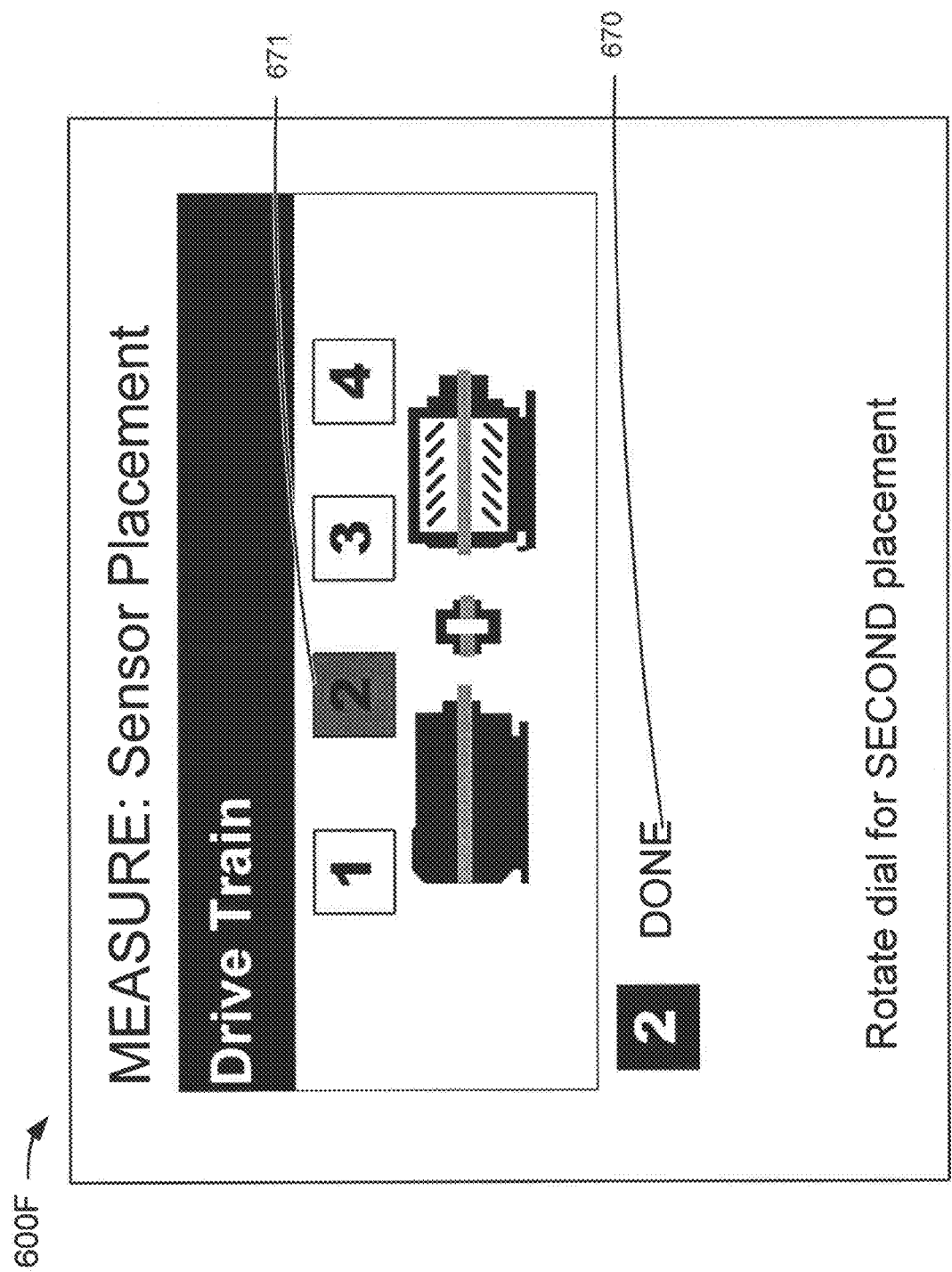

Then at block 550, the instrument 100 graphically displays the sensor location at which the data was just recorded. An example of a screen shot is shown in FIG. 6F. The sensor location 671 can be highlighted in a different color, for example green, to indicate that the sensor measurement for sensor location 2 has been completed. The text 670 also indicates that the measurement at location 2 is "DONE."

Figure 6G:
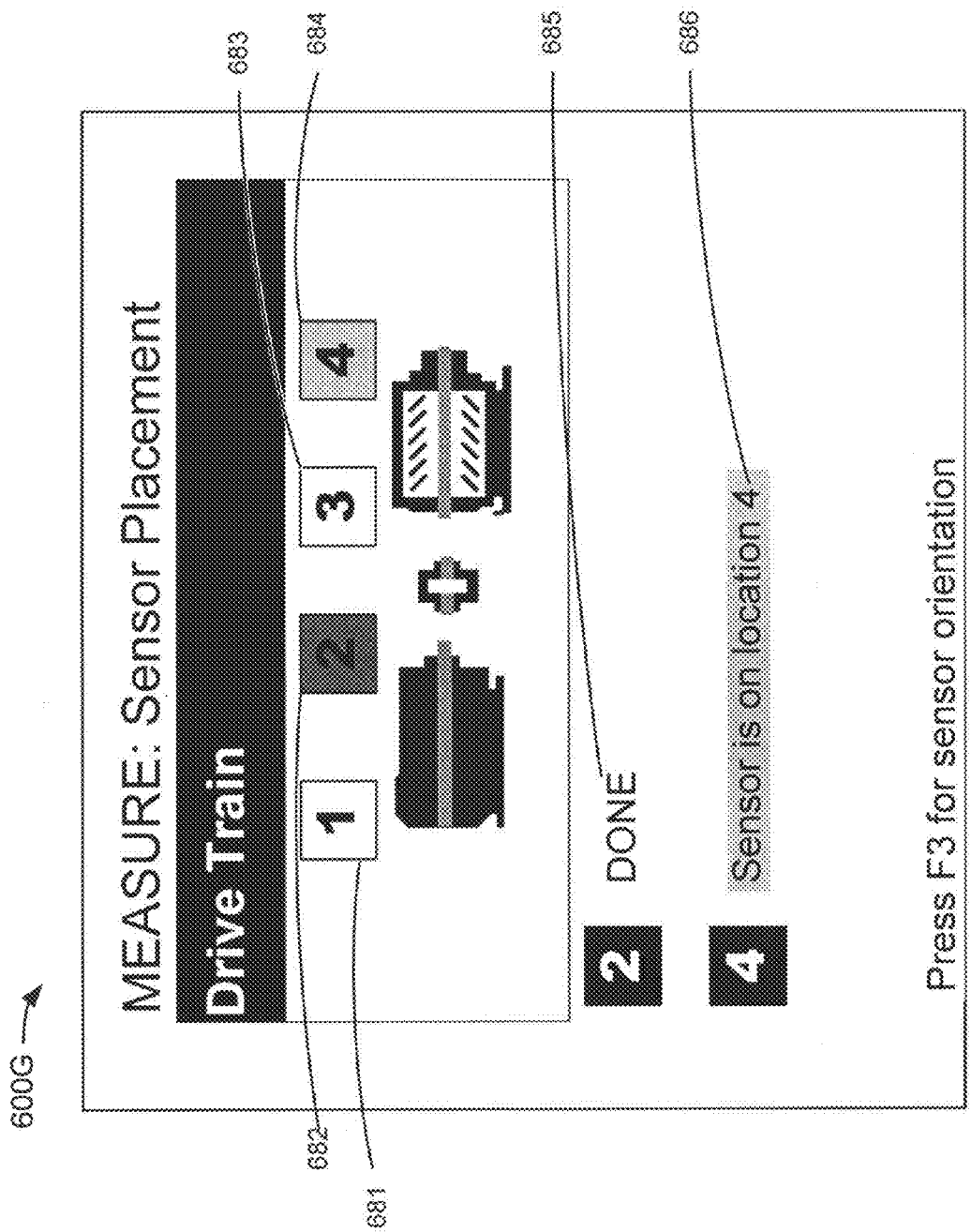

At decision block 555, the instrument 100 determines whether the user has selected the next sensor location for vibration data to be measured. FIG. 6G shows an example of a screen shot where the user has highlighted sensor location 4 as the next sensor location to be measured. In FIG. 6G, sensor location 2 682 is highlighted in one color, for example green, to indicate that the measurement has been completed, and sensor 4 684 is highlighted in another color, for example, orange, to indicate that this is the active sensor location to be measured. The first and third sensor locations 681 and 683 remain unhighlighted because neither has been measured nor selected to be measured yet. The different colors make it easy for the user to keep track of previously measured locations, the location currently being measured, and locations remaining to be measured. Further, the text 685 indicates sensor location 2 has been measured, and sensor location 4 is the active location selected to be measured. If the user has not selected the next sensor location (block 555—NO), the process remains at decision block 555. If the user has selected the next sensor location (block 555—YES), the instrument 100 returns to block 510 where the instrument 100 displays the sensor measurement locations for which data has not yet been obtained.

Figure 7A:
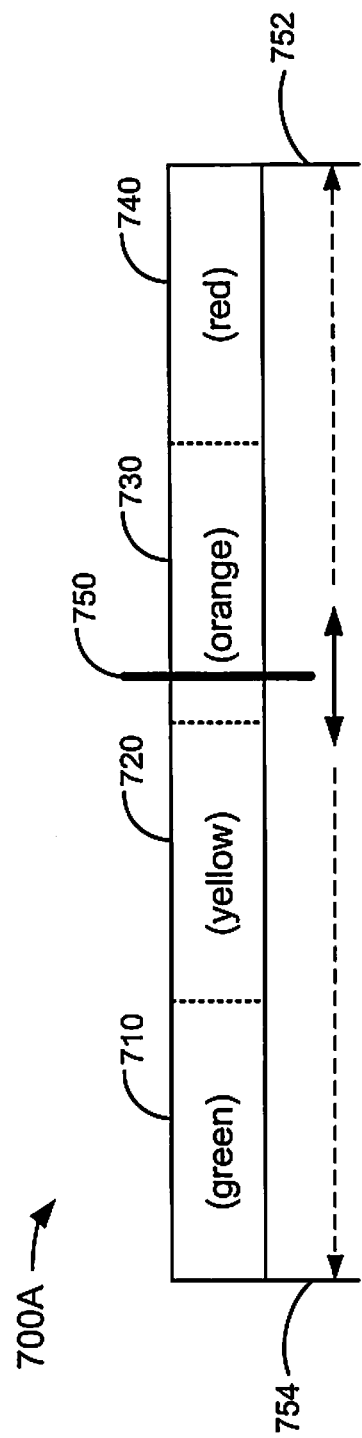
FIG. 7A shows a severity scale used as a graphical method of presenting the instrument's diagnosis of machinery faults to the user, according to an embodiment of the disclosure.

FIG. 7A depicts a severity scale 700A used as a graphical method of presenting the diagnosis of the instrument 100 to the user according to an embodiment of the disclosure. The severity scale 700A, for example, may be based upon the intensity of vibrations at the time of measurement by the instrument 100. As conditions change, the severity of the diagnosis may change and even appear to improve, for example immediately after lubrication of the machinery under test. However, over time, conditions generally may worsen as the machine continues operation and is subjected to wear and tear. Time to failure will vary depending upon the equipment type, age, machine load, environmental conditions, and other variables. Because it may not be possible to correlate each severity level with a specific time to failure, the severity scale only recommends actions to avoid machinery failure for each level of severity.

As shown in FIG. 7A, in one embodiment, the severity scale 700A is made up of four levels, where the levels progress in severity from least severe, on the left end of the scale 754, to most severe, on the right end of the scale 752. However, the severity scale can be made up of any number of levels, and the scale can extend horizontally or vertically. Examples of severity levels may include: slight 710, moderate 720, serious 730 and extreme 740. Each level may be color coded to provide an immediate indication to the user as to the severity of the diagnosis. Thus, for the least severe indication of problems, a green color code 710 may correspond to a 'slight' severity diagnosis, a yellow color code 720 may correspond to a 'moderate' diagnosis, an orange color code 730 may correspond to a 'serious' diagnosis, and a red color code 740 may correspond to an 'extreme' diagnosis. The indication of the severity of the diagnosis is provided by a slider 750 on the scale. The slider can range over the entire severity scale from least severe 754 to most severe 752.

For the 'slight' diagnosis, no maintenance action may be recommended. It may be recommended, however, that the machine be retested and that the condition be monitored after routine maintenance. For the 'moderate' diagnosis, maintenance action may be recommended to be undertaken on the scale of months, even up to a year later. It may also be recommended that the frequency of measurements be increased and that the condition of the machine be monitored. For the 'serious' diagnosis, maintenance action may be recommended within the next few weeks. It may also be recommended that maintenance action be performed during the next planned downtime or maintenance period. For the 'extreme' diagnosis, immediate maintenance action may be required. It may also be recommended that the operators consider shutting down the equipment and taking repair action immediately to avoid system failure.

Figure 7B:
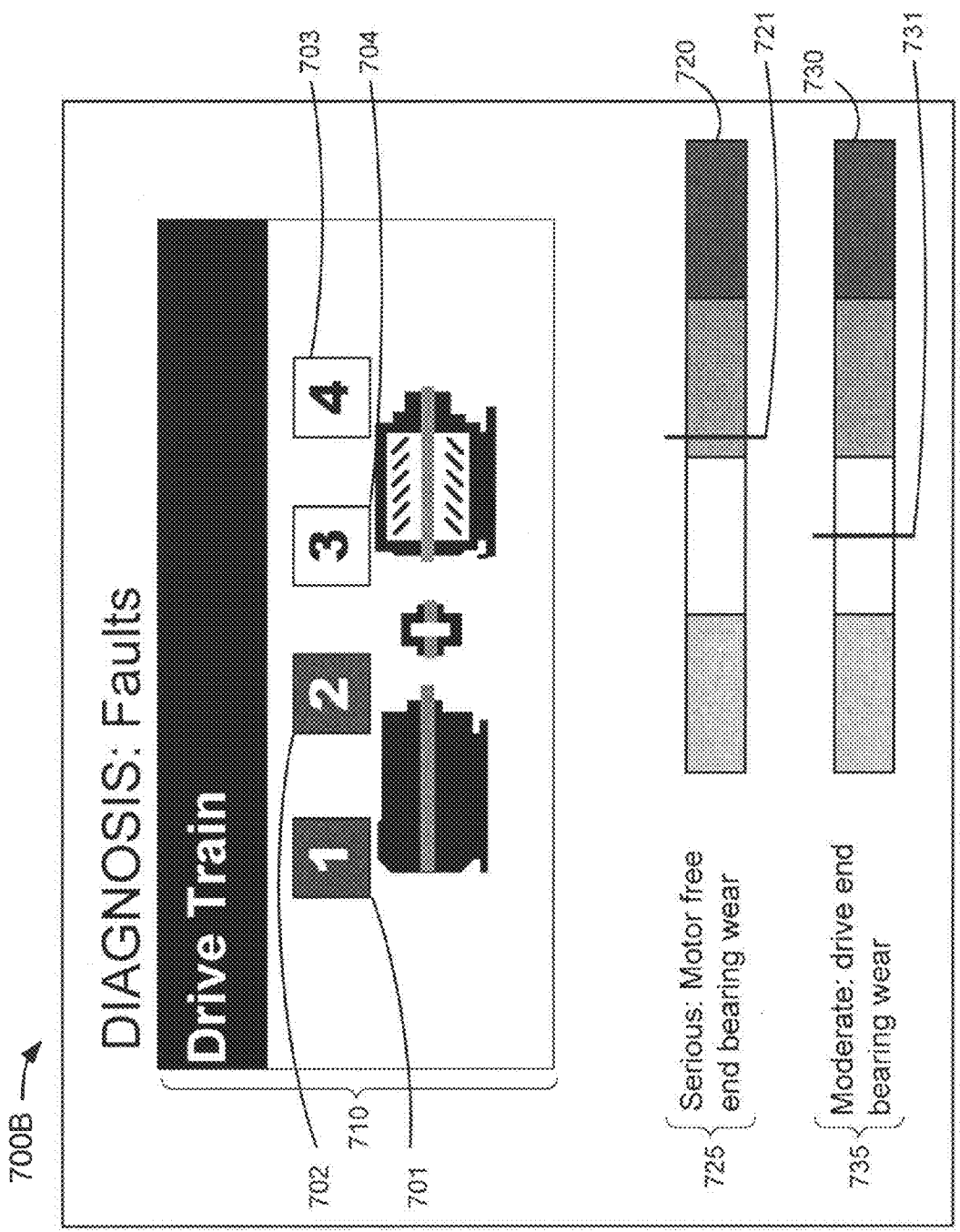
FIG. 7B shows an example screen shot for presenting a diagnosis of machinery faults to a user, according to an embodiment of the disclosure.

FIG. 7B shows an example of a diagnosis made by the diagnostic engine 150 as displayed using the diagnostic user interface 152. A graphic 710 of the drive train is shown at the top of FIG. 7B with four sensor measurement locations 701, 702, 703 and 704. First and second sensor locations 701 and 702 are highlighted in the graphic to draw the user's attention to the locations that have been diagnosed with machine faults. The unhighlighted sensor locations 703 and 704 indicate that no machine faults were diagnosed for those locations. Severity scales 720 and 730 and corresponding brief explanatory text 725 and 735 are shown below the graphic for each of the highlighted sensor locations. For the first sensor location 701, corresponding to the free end of the motor, the slider 721 on the severity scale 720 is located in the orange or 'serious' category, thus indicating that maintenance action may be recommended within the next few weeks. For the second sensor location 702, corresponding to the drive end of the motor, the slider 731 on the severity scale 730 is located in the yellow or 'moderate' category, thus indicating frequency of measurements should be increased and that the condition of the machine should be monitored over the next several months.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this patent application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. An instrument for measuring vibration and diagnosing rotating machinery faults, comprising:
    a machine setup engine configured to request and receive parameters about a machine from a user;
    a measurement engine configured to request and receive placement and orientation information for a vibration sensor relative to the machine and to track locations where sensor measurements have been completed;
    a data acquisition engine configured to receive data from the vibration sensor;
    a diagnostic engine configured to receive the data from the data acquisition engine and apply a rule set to the data to (1) diagnose machinery faults, and (2) determine a severity of the machinery faults; and
    a measurement user interface coupled to the measurement and diagnostic engines and configured to graphically show at least one of (1) the sensor placement and orientation relative to the machine, (2) locations identified by the user where measurements with the sensor have been taken, and (3) locations identified by the user where measurements with the sensor still need to be taken,
    wherein the diagnostic engine diagnoses the machinery faults based on data supplied by the sensor to the data acquisition engine and the parameters about the machine, rather than on previously taken vibration measurement monitoring data.

2. The instrument of claim 1, wherein the data acquisition module is further configured to measure shaft speed directly from a tachometer coupled to the machine.

3. The instrument of claim 1, wherein the sensor comprises a triaxial accelerometer.

4. The instrument of claim 1, wherein the sensor comprises a single axis accelerometer.

5. The instrument of claim 1, wherein the measurement user interface is configured to show a severity scale and a severity indicator located on the severity scale is configured to indicate a level of severity for each diagnosed machinery fault.

6. The instrument of claim 5, further comprising a textual explanation of the level of severity.

7. The instrument of claim 5, wherein the severity scale is a continuous scale divided into a plurality of severity categories, and each severity category is color-coded.

8. The instrument of claim 7, wherein a green color-code on the severity scale indicates a slight problem, a yellow color-code on the severity scale indicates a moderate problem, an orange color-code on the severity scale indicates a serious problem, and a red color-code on the severity scale indicates an extreme problem.

9. The instrument of claim 7, wherein the slight severity category means no maintenance action is recommended, the machinery should be retested, and the condition of the machinery be monitored after routine maintenance; the moderate severity category means maintenance action is recommended to be undertaken up to months, or even up to a year, later, a frequency of measurements should be increased, and the condition of the machine should be monitored; the serious severity category means maintenance action is recommended within the next few weeks, and maintenance action should be performed during the next planned downtime or maintenance period; and the extreme severity category means immediate maintenance action is required, the machinery should be shut down, and repair action should be undertaken immediately to avoid system failure.

10. The instrument of claim 1, further comprising a digital signal processor configured to convert time domain vibration sensor data from the sensor to frequency domain data.

11. The instrument of claim 1, wherein the machine setup engine comprises a machine setup user interface configured to request and receive gearing parameters.

12. The instrument of claim 11, wherein the machine setup user interface is configured to request and receive at least one of shaft speed, gear ratio, and gear tooth count.

13. The instrument of claim 11, wherein the machine setup user interface is configured to request and receive a type of bearing that is used in the gearing.

14. The instrument of claim 11, wherein the machine setup user interface is configured to request and receive a number of speed changers used in the gearing.

15. A method of diagnosing faults of a rotating machine including a gearbox, comprising:
- requesting and receiving information by a diagnostic instrument about a number of speed changers used in the gearbox;
- requesting information by the diagnostic instrument about at least one parameter of the gearbox including shaft speed, gear ratio, or gear tooth count;
- if a user selects shaft speed, receiving input shaft speed and output shaft speed of the gearbox by the diagnostic instrument;
- if the user selects gear ratio, receiving a gear ratio between the input and the output of the gearbox by the diagnostic instrument;
- if the user selects gear tooth count, receiving gear tooth counts of an input gear and an output gear of the gearbox by the diagnostic instrument;
- taking vibration measurements of the rotating machine with a sensor; and
- diagnosing the faults of the rotating machine by the diagnostic instrument based on the vibration measurements taken with the sensor and user-provided information about the gearbox.

16. The method of claim 15, further comprising:
- requesting by the diagnostic instrument information about a type of bearing used in the gearbox;
- receiving by the diagnostic instrument information about the type of bearing used in the gearbox.

17. The method of claim 15, further comprising:
- requesting by the diagnostic instrument information about a flexible coupling with the gearbox; and
- receiving by the diagnostic instrument information about the flexible coupling.

18. A method of determining and tracking vibration measurements with a sensor for diagnosing faults of a rotating machine, comprising:
- receiving parameters by a diagnostic instrument about components of the rotating machine;
- receiving by the diagnostic instrument a selected vibration measurement location;
- displaying by the diagnostic instrument sensor orientation options on a graphical model of the rotating machine;
- receiving a selected sensor orientation;
- taking vibration measurements with the sensor; and
- diagnosing the faults of the rotating machine by the diagnostic instrument based on the vibration measurements taken with the sensor rather than on previously taken vibration measurement monitoring data.

19. The method of claim 18, wherein the sensor is a triaxial accelerometer.

20. A non-transitory computer-readable medium carrying instructions for a method to determining and tracking vibration measurements with a sensor for diagnosing faults of a rotating machine, the method comprising:
- receiving parameters of components of the rotating machine;
- receiving a selected vibration measurement location;
- displaying sensor placement options on a graphical model of the rotating machine;
- receiving a selected sensor placement;
- taking a vibration measurement with the sensor; and
- displaying the vibration measurement at the selected vibration measurement location on the graphical model of the rotating machine,
- wherein faults of the rotating machine are diagnosed based upon the vibration measurement taken with the sensor rather than on previously taken vibration measurement monitoring data.

\* \* \* \* \*